July 6, 1926.　　　　　P. J. MEINERS　　　　　1,591,768
ENSILAGE PROTECTOR
Filed June 2, 1925　　　2 Sheets-Sheet 1

Inventor
P. J. Meiners
By [signature]
Attorney

July 6, 1926.
P. J. MEINERS
ENSILAGE PROTECTOR
Filed June 2, 1925    2 Sheets-Sheet 2
1,591,768
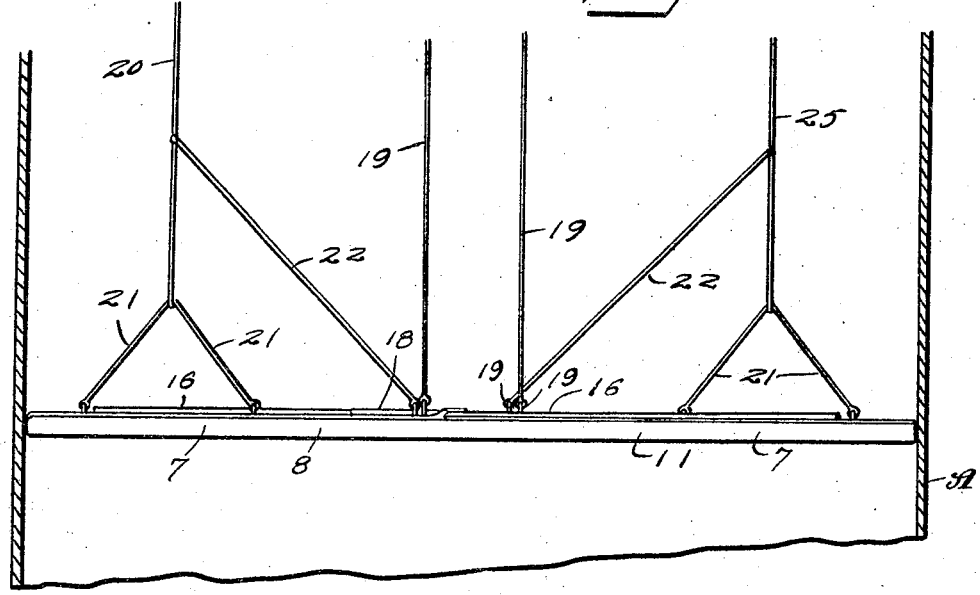
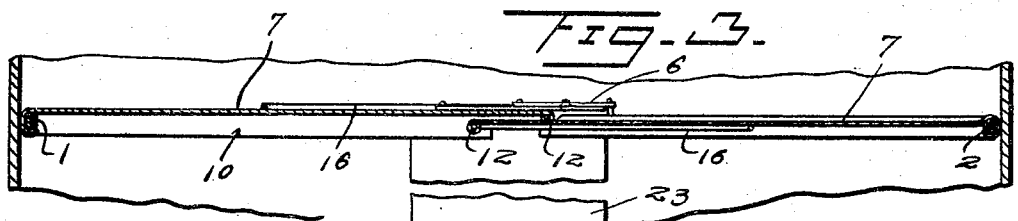
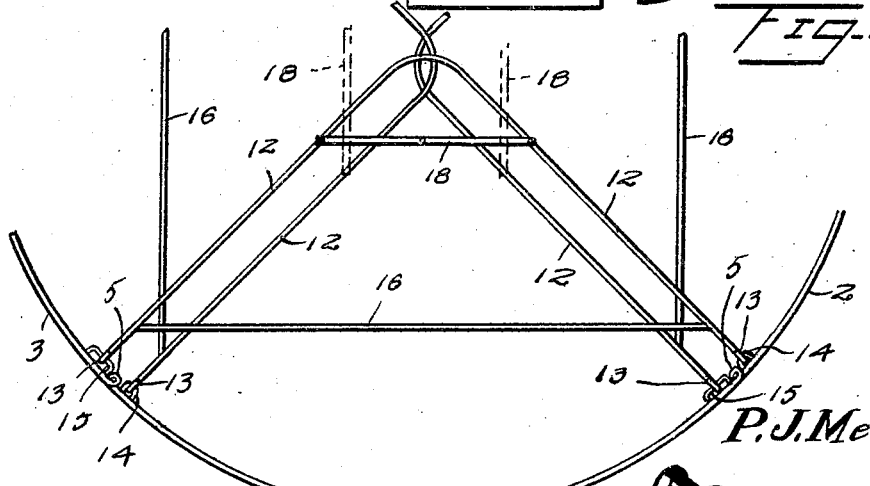
Inventor
P. J. Meiners
By
Attorney Patented July 6, 1926.

1,591,768

UNITED STATES PATENT OFFICE.

PAUL J. MEINERS, OF EITZEN, MINNESOTA.

ENSILAGE PROTECTOR.

Application filed June 2, 1925. Serial No. 34,440.

The invention relates to means for protecting ensilage in silos from direct contact with the air which in cold weather is liable to freeze the upper layers of the ensilage, and at all times is liable to cause spoiling of the ensilage, and has for its object the provision of a cover so constructed that it may be moved downwardly and secured to the walls of the silo as the ensilage is used out, so as to provide a dead air space immediately above the ensilage and prevent contact of the atmosphere with the ensilage.

The details of the construction of the invention will be described hereinafter and its advantages explained, and will be found illustrated in the accompanying drawings, in which—

Figure 1:
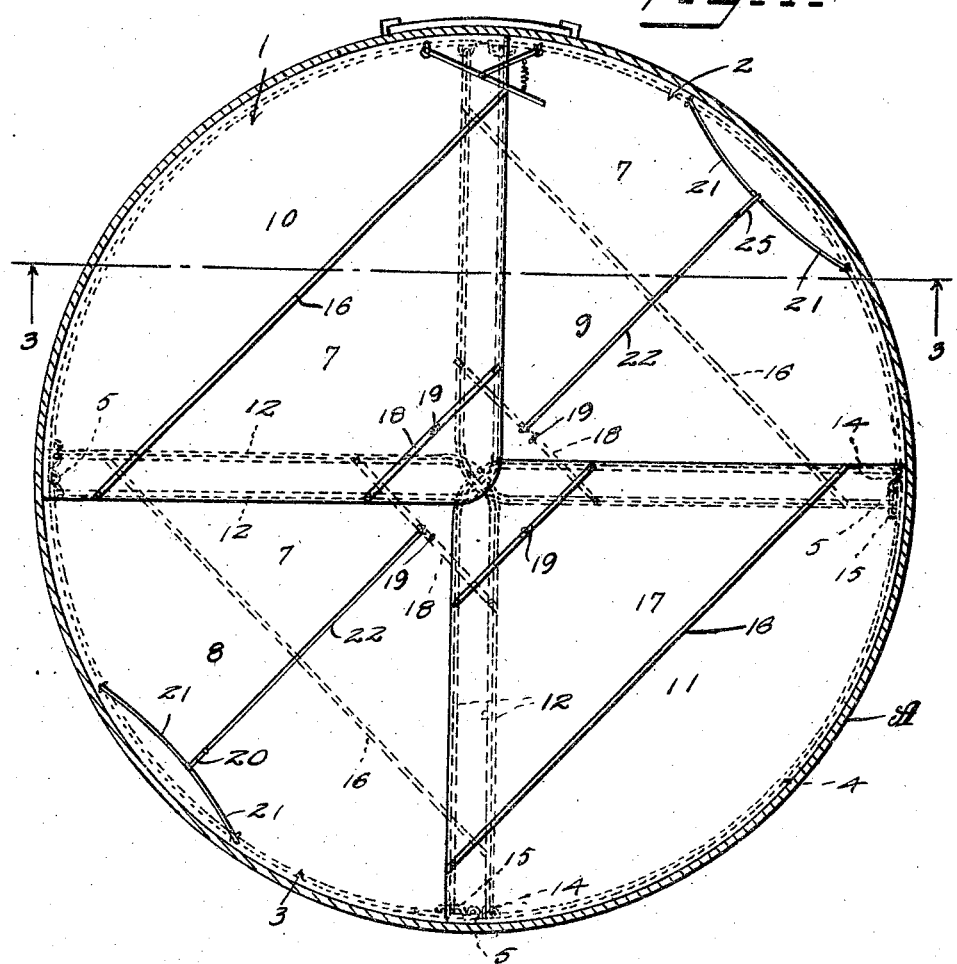
Figure 4:
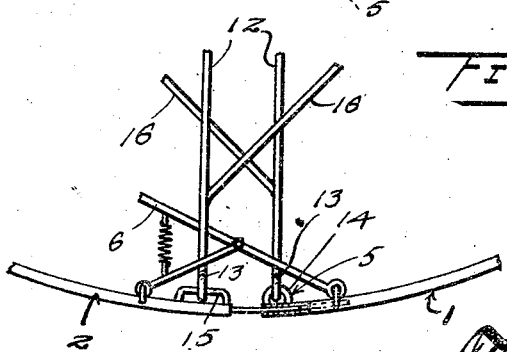

Figure 1 is a transverse sectional view of a conventional silo showing the improved ensilage cover in place, Figure 2, a vertical sectional view of a fragment of the silo showing the cover in place, Figure 3, a cross section of the protector on the line 3—3 of Figure 1, Figure 4, a detail of the means for expanding and contracting the protector frame, and Figure 5, a detail of one of the hinged portions.

In the drawings similar reference characters will be used to designate corresponding parts throughout the several views.

The improved ensilage protector is designed to as nearly as possible hermetically seal the silo immediately above the ensilage to prevent contact of the atmosphere with the ensilage which in freezing weather is liable to freeze the upper layers of the ensilage, and to spoil the ensilage by promoting fermentation.

The protector comprises a frame on which is hinged a plurality of hinged cover leaves, the frame being designed to fit snugly the inner surface of the walls of the silo, and as the standard silo is circular in cross section the frame will be circular in shape and to insure fitting snugly the walls of the silo and to permit adjustment of the frame downwardly as the ensilage is used out of the silo, the frame will be made of a plurality of sections designated 1, 2, 3, and 4. Sections 1 and 2 are hinged together and sections 1 and 3, and 2 and 4 are also hinged together, the hinges being designed 5. The meeting ends of the sections 3 and 4 are overlapped and are provided with means for expanding and contracting the frame, the means shown in the drawings being a toggle lever 6, but other means may be provided for this purpose.

The frame sections 1, 2, 3 and 4 will be made of steel bars or other suitable material shaped into arcuate form and in order to insure tight fit with the walls of the silo designated A, the bars will be covered with a fabric designated 7.

Hinged to the frame comprising the arcuate bars 1, 2, 3 and 4, are a plurality of cover leaves, the number of leaves shown in the drawings being four, and said leaves being designated respectively, 8, 9, 10 and 11. Each of said leaves comprises an outer frame angular in shape and designated 12 and having its two ends provided with an eye 13 forming one of the members of a hinge for the cover leaf. A circular eye loop 14 is secured to the frame and engages the eye 13 at one end of each leaf, while an elongated loop 15 is secured to the frame and engages the eye loop 13 at the other end of each leaf, this arrangement being necessary to permit adjustment of the frame in expanding it and contracting it as hereinbefore referred to.

Each of the leaves 8, 9, 10 and 11 comprises a canvas cover that is secured to the angular frame 12 and is also secured to the outer frame comprising the sections 1, 2, 3, and 4. As shown in the drawings the leaves are arranged to overlap, and two of the leaves, designated 8 and 9 will be arranged under the leaves 10 and 11 and will be hinged on a slightly lower plane than the hinges of said leaves 10 and 11.

The frame 12 of each of the cover leaves is braced by a rod 16 connecting the two sides of the frame from a point adjacent the hinged ends, and to insure the overlapped portions of the leaves fitting snugly the brace rods 16 on the leaves 8 and 9 will be arranged under the canvas cover 17, while the brace rods 16 on the leaves 10 and 11 will be above the canvas cover. Other cross rods 18 are also secured to each of the frames 12 adjacent to the angle of each frame and secured to said cross rods are ropes 19 to raise and lower the leaves, said ropes extending up and running over suitable sheaves or pulleys (not shown) and down outside of the silo to permit the operation of the leaves from outside of the silo.

Other ropes 20 are also provided to raise and lower the frame carrying the cover leaves, said ropes 20 having branches 21 secured to the outer frame, and a branch 22 secured to the cross bar 18 on each of the cover leaves 8 and 9.

23 indicates an apron secured to the outer frame and is designed to be drawn across the door of the silo and secured in any suitable manner.

It will be apparent that in operation the frame comprising the sections, 1, 2, 3, and 4 will be secured in position by expanding the frame against the walls of the silo with the expanding device designated 6, a few inches above the surface of the ensilage but not sufficiently close to permit any parts of the device to touch the ensilage and when so positioned and the cover leaves are in their closed position the atmosphere will be prevented from contacting with the ensilage.

When the silo is being filled with ensilage, the cover will be drawn up to the top of the silo and then as the ensilage is used out the cover will be lowered from time to time to protect the ensilage from disintegration either by freezing or souring, the cover leaves being open to permit dispensing of the ensilage from the silo and closed again after each feeding therefrom, the door opening of the silo under the protector being closed by means of the apron 23.

What is claimed is:—

1. An ensilage protector for silos, comprising a frame shaped to fit the inner walls of the silo, leaves hingedly secured to said frame and having their edges overlapping, the alternate leaves on said frame being under the remaining leaves, means secured to the frame and to the undermost leaves to support the frame and leaves, and means secured to each individual leaf to raise and lower it.

2. An ensilage protector for silos, comprising a frame shaped to fit the inner walls of the silo, leaves hingedly secured to said frame and having their edges overlapping, the alternate leaves on said frame being under the remaining leaves, flexible members supporting said frame, branch flexible members secured to the first mentioned flexible members and to the frame and to the undermost leaves, and other flexible members secured to the leaves to raise and lower them.

3. An ensilage protector for silos, comprising an adjustable frame shaped to fit the inner walls of the silo, leaves hingedly secured to said frame, and having their edges overlapping, the alternate leaves on said frame being under the remaining leaves, means secured to the frame and to the undermost leaves to support frame and leaves, and means secured to the leaves to individually raise and lower them.

4. An ensilage protector for silos, comprising a frame formed of hinged sections, an expansible and contractible joint connecting two adjacent sections, leaves hingedly secured to said frame and having their edges overlapping, the alternate leaves on said frame being under the remaining leaves, means secured to the frame and to the undermost leaves to support the frame and leaves, and means secured to the leaves to individually raise and lower them.

In testimony whereof I affix my signature.

PAUL J. MEINERS.